Patented Feb. 19, 1952

2,586,633

UNITED STATES PATENT OFFICE 2,586,633

ACETYLATION OF CELLULOSE

Evan F. Evans, Wilmington, Del., assignor to Hercules Powder Company, Wilmington, Del., a corporation of Delaware No Drawing. Application June 10, 1949, Serial No. 98,395

3 Claims. (Cl. 260—227)

This invention relates to an improved process of acetylating cellulose and, more particularly, to a process of preparing a fibrous cellulose triacetate by reacting cellulose with a boron trifluoride-acetic anhydride acetylation mixture.

It is well known that boron trifluoride will function as a catalyst for the acetylation of cellulose. However, the prior art procedures have suffered from many disadvantages. It has been suggested that cellulose be acetylated with a mixture made up of approximately equal quantities of acetic acid and acetic anhydride using a catalytic amount of boron trifluoride as the catalyst; i. e., an amount equal to about 2% of the weight of cellulose treated. The product obtained by this process is not in fibrous form and if an attempt be made to modify the process by adding an inert diluent in order to obtain the product in fibrous form, extreme difficulty is encountered in maintaining the proper ratio of diluent to the acetylating mixture in order to avoid the formation of a sticky, doughy product. Furthermore, the product obtained by this process is nonuniform and of poor quality. It has also been suggested that cellulose be acetylated with a mixture made up chiefly of acetic acid using a boron trifluoride complex as catalyst. The product obtained by this process is not a triacetate nor is it obtained in fibrous form.

Now in accordance with this invention, it has been found that a fibrous cellulose triacetate may be prepared by reacting cellulose with a boron trifluoride-acetic anhydride acetylation mixture in which the amount of boron trifluoride is equal to from about 10% to about 20% of the total acetylation mixture. This process has the advantage over the prior art acetylation processes of producing a fully acetylated cellulose and, at the same time, obtaining the product in a fibrous form without the necessity of resorting to the use of inert diluents.

The following examples are illustrative of the process in accordance with this invention. All parts and percentages are by weight unless otherwise indicated.

Example 1

An acetylation mixture was prepared by absorbing boron trifluoride in acetic anhydride with strong cooling until a copious precipitate was formed and then adding acetic anhydride until the precipitate was just dissolved at room temperature. This boron trifluoride-acetic anhydride acetylation mixture contained about 14% boron trifluoride. One part of chemical cotton, pretreated with 0.4 part of acetic acid, was reacted with 17 parts of the above acetylation mixture for 10 minutes at 50°–60°C. The fibrous product was removed by filtration, washed with acetic anhydride and then with hot water and finally was dried. On analysis, the product was found to be cellulose triacetate, containing a theoretical amount of combined acetic acid of 62.5%. It had retained the fibrous structure of the original cellulose, was soluble in the usual primary acetate solvents such as 9:1 methylene chloride:ethanol; 9:1 chloroform:ethanol; and 9:1 ethylene tetrachloride:methanol yielding brilliantly clear, viscous solutions and it exhibited an intrinsic viscosity of 1.6.

Example 2

An acetylation mixture containing 16.3% boron trifluoride was prepared by absorbing boron trifluoride with cooling in acetic anhydride. One part of chemical cotton, pretreated with 0.4 part of acetic acid, was reacted with 17.7 parts of the above acetylation mixture for 30 minutes at 45° C. The fibrous product was separated by filtration, washed with acetic anhydride, then with hot water and finally dried. The cellulose triacetate so obtained had the same properties as described in Example 1.

Fibrous cellulose triacetates were likewise obtained when the above acetylation was repeated except that the acetylation mixture contained 11.8% and 13.5% boron trifluoride.

Example 3

An acetylation mixture was prepared by absorbing boron trifluoride in a cooled mixture of acetic anhydride and acetic acid, the final acetylation mixture containing 15.0% boron trifluoride, 38.6% acetic acid and 46.4% acetic anhydride. One part of chemical cotton, pretreated with 0.4 part of acetic acid, was reacted with 23.3 parts of the above acetylation mixture for 20 minutes at 62° C. The fibrous product was separated by filtration, washed with acetic anhydride and then with methanol and finally was dried at 105° C. for 1 hour. A yield of 1.32 parts of cellulose triacetate was obtained. The product retained the fibrous structure of the original cellulose and was soluble in the usual primary acetate solvents such as a 9:1 mixed solvent of methylene chloride and ethanol.

Example 4

One part of chemical cotton, pretreated with 0.4 part of acetic acid, was intimately mixed with 7 parts of an acetylation mixture, containing about 14% boron trifluoride and prepared as described in Example 1, and 16 parts of carbon tetrachloride. The reaction was carried out at 60° C. for 14 minutes. The fibrous product was removed by filtration, washed successively with acetic anhydride, methyl alcohol, and boiling water and then was dried. The fibrous cellulose triacetate so obtained contained the theoretical quantity of combined acetic acid (62.5%) and gave brilliantly clear, viscous solutions in a 9:1 mixed solvent of methylene chloride and ethanol.

*Example 5*

An acetylation mixture containing 14.7% boron trifluoride was prepared by absorbing 4.62 parts of boron trifluoride in 7.81 parts of acetic anhydride and then adding 18.97 parts of acetic anhydride to just dissolve the crystalline material. One part of chemical cotton, pretreated with 0.4 part acetic acid, was intimately mixed with 2.94 parts of the above acetylation mixture and 14 parts of an aliphatic hydrocarbon solvent having a boiling range of 90°–120° C. The reaction was carried out with agitation at 50° C. for 20 minutes. The fibrous product was separated by filtration, washed successively with acetic anhydride, pentane, methanol and boiling water and then was dried for 2 hours at 100° C. The fibrous cellulose triacetate so obtained was soluble in a 9:1 methylene chloride-ethanol solution and exhibited an intrinsic viscosity of 1.06. It was extremely stable toward heat, remaining fibrous and white when heated for 2 hours at 210° C. in the presence of air and had an intrinsic viscosity after this heating of 0.93.

In accordance with this invention, cellulose may be acetylated by contacting the cellulose with a boron trifluoride-acetic anhydride acetylation mixture which contains from 10 to 20% boron trifluoride, whereby cellulose triacetate in fibrous form is produced. Any fibrous cellulose may be so treated to produce the fibrous cellulose triacetate as, for example, chemical cotton (such as purified cotton linters), wood pulp, hydro-celluloses, straw celluloses, etc. The cellulose may be pretreated, as for example with acetic acid, if desired. A pretreatment process is not necessary but has the advantage of increasing the uniformity of the product and also increasing the speed of the reaction. This pretreatment process may be carried out by mixing the cellulose with acetic acid and allowing the mixture to stand for a period of time of from about 20 minutes to several days. Any amount of acetic acid may be used for this pretreatment from less than 1% to soaking the cellulose in excess acid and then removing the latter by pressing, centrifuging, etc. If the cellulose used in the process of this invention is subjected to such a pretreatment, care should be exercised that an excessive amount of acetic acid does not remain in the cellulose. The amount of acid remaining in the cellulose should not exceed that amount which if added to the acetylation mixture being used, would result in a mixture containing more than about 40% acetic acid.

The acetylation mixture which is used in accordance with this invention comprises acetic anhydride and boron trifluoride, the latter being equal to from about 10 to about 20% of the weight of the total acetylation mixture and preferably from about 12 to about 18%. That the boron trifluoride content of the acetylation mixture is the critical factor in the preparation of a fibrous cellulose triacetate is most surprising. Thus it has been found that although the ratio of boron trifluoride to cellulose is held constant, if the boron trifluoride content of the acetylation mixture is less than about 10%, the fibrous structure is retained but the acetylation is nonuniform and the product is of poor quality due to the presence of too many insoluble, birefringent fibers in solutions of the product. On the other hand, if the boron trifluoride content is too great, especially an amount of 33% or above, the triacetate dissolves and the product does not retain the fibrous structure.

The acetylation mixture preferably contains no added acetic acid. The presence acetic acid slows down the reaction rate proportionately to the amount of it which is present and above about 40% of acetic acid, the fibrous structure of the product is partially or wholly lost, and the acetate is partially or wholly dissolved. When the acetylation mixture is added to a cellulose which has been subjected to an acetic acid pretreatment, the final reaction mixture will then contain a small amount of acetic acid, but the amount of acetic acid used in the pretreatment process should be kept as low as possible. Thus, while the acetylation mixture in accordance with this invention preferably contains no added acetic acid, the final reaction mixture may contain acetic acid from the pretreatment step, but less than 40% of the total reaction mixture. The amount of acetic acid in the final reaction mixture is desirably kept at a minimum in order to insure the production of a fibrous product and at the maximum rate of reaction.

Thus, the acetylation mixture used in accordance with this invention may be defined as one containing from about 10 to 20% boron trifluoride, from zero to about 40% acetic acid, and from about 40 to about 90% acetic anhydride and preferably contains from about 12 to about 18% boron trifluoride and from about 82 to about 88% acetic anhydride.

As pointed out above, it is the boron trifluoride content of the acetylation mixture which is the critical factor and not the boron trifluoride to cellulose ratio. Therefore, the amount of acetylating mixture used on any given amount of cellulose may vary widely but, to produce the triacetate, must be sufficient to provide at least the theoretical amount of acetic anhydride needed, and preferably is used in excess. Any excess amount of the acetylating mixture described above may be used without loss of the fibrous structure of the cellulose.

The acetylation process in accordance with this invention provides a method of producing a fibrous cellulose triacetate without the use of diluents. In the past, a fibrous product has only been obtained by the addition of a nonsolvent diluent to an acetylating mixture which, in the absence of the diluent, would lead to the loss of the fibrous structure. In such processes the ratios of acetylating mixture to diluent and of acetylating mixture to cellulose had to be kept within narrow limits or otherwise the fibrous structure was partially or wholly lost. In the process of this invention, as shown by Examples 1 to 3, it is not necessary to use a diluent in order to obtain the fibrous cellulose triacetate. However, if desired, a diluent may be used in order to simplify the recovery of the reagents employed as shown in Examples 4 and 5. When a diluent is used in the process of this invention, it may be used in any amount in relation to either the amount of cellulose used or to the amount of acetylating mixture employed without affecting the production of the fibrous cellulose triacetate. Any diluent which is not a solvent for the cellulose triacetate and which is inert to the acetic anhydride-boron trifluoride mixture may be used. Diluents such as ethyl acetate or diethyl ether, which form stable complexes with boron trifluoride, may not be considered as inert diluents and actually either prevent or slow down the acetylation reaction. Examples of inert diluents which may be used are the aliphatic hydrocarbon solvents such as hexane, heptane, petroleum ether, etc., chlorinated solvents such as carbon tetrachloride and trichloroethylene, etc.

The acetylation reaction may be carried out at temperatures of from about 20° to about 80° C. and preferably from about 40° to about 70° C. The length of time at which the reaction mixture is held at this temperature will depend upon the temperature, the size of the batch, etc. In general, the reaction is complete within a few minutes at temperatures of 50° to 70° C. but at lower temperatures a half hour or longer may be required.

The fibrous cellulose triacetate may be separated from the reaction mixture by filtration, centrifugation, decantation, or any other known method. The fibrous cellulose triacetate may be treated by any desired means to remove the boron trifluoride. Usually, a simple washing operation with wash liquids such as acetic anhydride, methanol, and water are employed although any other combination which will remove the boron trifluoride and at the same time retain the fibrous structure of the product may be utilized. Obviously, the wash liquid should not be a liquid which is a solvent for the cellulose triacetate.

Acetylations which yield fibrous products are advantageous over the prior art solution processes in that the product is more easily separated from the reaction mixture and the excess reagents used in the process are more easily recovered. The fibrous product is in itself advantageous in that it is more easily dissolved in the preparation of solutions, etc. The process of this invention has provided a simple and economical method of preparing fibrous cellulose triacetate without the necessity of using inert diluents and, at the same time, obtaining the completely acetylated product.

What I claim and desire to protect by Letters Patent is:

1. The process of preparing a fibrous cellulose triacetate by an inert diluent-free process which consists of reacting cellulose with an acetylation mixture consisting of from about 10% to about 20% boron trifluoride, from 0 to about 40% acetic acid, and from about 40% to about 90% acetic anhydride, the amount of the acetylation mixture used being such as to provide an excess of acetic anhydride over the amount theoretically required for the formation of the cellulose triacetate.

2. The process of preparing a fibrous cellulose triacetate by an inert diluent-free process which consists of reacting cellulose with an acetylation mixture consisting of from about 10% to 20% boron trifluoride, from 0 to about 40% acetic acid, and from about 40% to about 90% acetic anhydride, the amount of the acetylation mixture used being such as to provide at least the amount of acetic anyhydride theoretically required for the formation of the cellulose triacetate.

3. The process of preparing a fibrous cellulose triacetate by an inert diluent-free process which consists of reacting cellulose with an acetylation mixture consisting of from about 12% to about 18% boron trifluoride, from 0 to about 40% acetic acid, and from about 42% to about 88% acetic anhydride, the amount of the acetylation mixture used being such as to provide an excess of acetic anhydride over the amount theoretically required for the formation of the cellulose triacetate.

EVAN F. EVANS.

REFERENCES CITED

The following references are of record in the file of this patent:

UNITED STATES PATENTS

| Number | Name | Date |
| --- | --- | --- |
| 2,300,213 | Flaherty | Oct. 27, 1942 |

OTHER REFERENCES

Ott: Cellulose and Cellulose Derivative, pages 681–682, Interscience Pub. Inc., New York, 1934.